US009188967B2

(12) United States Patent
Hazra et al.

(10) Patent No.: US 9,188,967 B2
(45) Date of Patent: Nov. 17, 2015

(54) ENFORCING FINE-GRAINED DEMAND MANAGEMENT IN SMART GRIDS

(71) Applicants: International Business Machines Corporation, Armonk, NY (US); Universiti Brunei Darussalam, Gadong (BE)

(72) Inventors: Jagabondhu Hazra, Bangalore (IN); Saiful A. Husain, Brunei (BN); Shivkumar Kalyanaraman, Bangalore (IN); Balakrishnan Narayanaswamy, Bangalore (IN)

(73) Assignees: International Business Machines Corporation, Armonk, NY (US); Universiti Brunei Darussalam, Brunei Darussalam ( * ) Notice: Subject to any disclaimer, the term of this patent is extended or adjusted under 35 U.S.C. 154(b) by 476 days.

(21) Appl. No.: 13/658,423

(22) Filed: Oct. 23, 2012

(65) Prior Publication Data

US 2014/0114487 A1    Apr. 24, 2014

(51) Int. Cl.
*G05B 13/02* (2006.01)
*H02J 3/00* (2006.01)

(52) U.S. Cl.
CPC .. *G05B 13/02* (2013.01); *H02J 3/00* (2013.01)

(58) Field of Classification Search
USPC .......... 700/286, 288, 289, 291, 296, 278, 726
See application file for complete search history.

(56) References Cited

U.S. PATENT DOCUMENTS

| | | | |
|---|---|---|---|
| 6,528,957 B1 * | 3/2003 | Luchaco | 315/307 |
| 6,874,691 B1 | 4/2005 | Hildebrand et al. | |
| 7,389,189 B2 | 6/2008 | Williams et al. | |
| 7,420,293 B2 * | 9/2008 | Donnelly et al. | 307/34 |
| 7,460,930 B1 | 12/2008 | Howell et al. | |
| 7,705,484 B2 | 4/2010 | Horst | |
| 8,024,073 B2 | 9/2011 | Imes et al. | |
| 8,073,573 B2 * | 12/2011 | Chassin et al. | 700/286 |

(Continued)

FOREIGN PATENT DOCUMENTS

| WO | 2010031017 | 3/2010 |
|---|---|---|
| WO | 2011014073 | 2/2011 |

OTHER PUBLICATIONS

Jawurek, Marek, et al., "Privacy Threat Analysis of Smart Metering," INFORMATIK, Lecture Notes in Informatics, Oct. 4-7, 2011, 15 pages, Berlin, Germany.

*Primary Examiner* — Kidest Bahta
(74) *Attorney, Agent, or Firm* — Ference & Associates LLC

(57) ABSTRACT

Methods and arrangements for enforcing demand management in electrical grids. Electrical power is provided from an electrical network to at least one substation, the electrical network including an electrical generation grid in communication with the at least one substation, the at least one substation comprising a power limiter. Electrical power is provided from the at least one substation to a plurality of locations, each location comprising a smart power demand manager which controls electrical power delivery to at least power-drawing item. There is detected, with respect to the electrical network, at least one discrepancy comprising at least one of: an unbalanced network load; an unscheduled network load; a change in network supply; and a change in network condition. In response to such detection, electrical power delivery is controlled via employing the power limiter of the at least one substation in collaboration with at least one smart power demand manager.

20 Claims, 8 Drawing Sheets

(56) References Cited

U.S. PATENT DOCUMENTS

| | | | |
|---|---|---|---|
| 8,692,409 B2* | 4/2014 | Jouper | 307/31 |
| 8,942,835 B2* | 1/2015 | Gerdes et al. | 700/90 |
| 8,954,612 B2* | 2/2015 | Giroti | 709/249 |
| 2006/0049694 A1* | 3/2006 | Kates | 307/132 E |
| 2008/0167931 A1* | 7/2008 | Gerstemeier et al. | 705/8 |
| 2010/0010683 A1* | 1/2010 | Kates | 700/293 |
| 2010/0332373 A1* | 12/2010 | Crabtree et al. | 705/37 |
| 2011/0010016 A1 | 1/2011 | Giroti | |
| 2011/0153106 A1 | 6/2011 | Drake et al. | |
| 2011/0172841 A1* | 7/2011 | Forbes, Jr. | 700/292 |
| 2012/0080420 A1 | 4/2012 | Hui et al. | |
| 2012/0147802 A1 | 6/2012 | Ukita et al. | |
| 2012/0158196 A1 | 6/2012 | Eldershaw et al. | |

\* cited by examiner $$\underset{p_i^t}{\text{maximize}} \sum_{\text{loads } i} U_i(z^t) - \sum_t C_t(p_1^t, \ldots, p_n^t)$$

subject to $$f(z^t) \in \mathcal{T}$$

$C_t$ is the cost to meet a particular generation
$F(z)$ is the feature extractor as defined in the unbalance detector

FIG. 2

$$\underset{x^1,\ldots,x^T}{\text{maximize}} \sum_{i=1}^{n} U_i(z_i^{t_i^{st}},\ldots,z_i^{t_i^{en}})$$

subject to $$\sum_i z_i^t \leq x^t$$

Where $x^t$ is the total consumption budget in slot $t$, $z_i^t$ is the consumption level of appliance $i$ in slot $t$ and $U_i(z_i^{t_i^{st}},\ldots,z_i^{t_i^{en}})$ is the utility gained by running appliance $i$ from $t_i^{st}$ to $t_i^{en}$ at consumption levels $z_i^{t_i^{st}},\ldots,z_i^{t_i^{en}}$.

FIG. 4

ENFORCING FINE-GRAINED DEMAND MANAGEMENT IN SMART GRIDS

BACKGROUND

Electricity use can vary dramatically in relatively short time frames, and instantaneous generation costs can thereby increase sharply as additional higher-cost ("peaking") sources are brought on-line. To accommodate this, energy demand management, also known as demand side management (DSM), has emerged as a broad set of programs and efforts to modify consumer demand for energy, usually through various methods such as financial incentives and education.

It has been argued that DSM has been ineffective because it has often resulted in higher utility costs for consumers and less profit for utilities. A fundamental problem with DSM is the difficulty in ensuring any reliability of demand reduction. For example, if a utility has to reduce load for the sake of grid stability, e.g., due to a lack of renewable energy or for cost reasons, even as drastic a measure as increasing prices may not lead to a reduction in demand in reality. Another major problem of DSM is connected with privacy, in that consumers often need to provide some detailed information about specifics of their usage to their electric company. Needless to say, consumers often find this to be highly intrusive.

BRIEF SUMMARY

In summary, one aspect of the invention provides a method comprising: providing electrical power from an electrical network to at least one substation, the electrical network including an electrical generation grid in communication with the at least one substation, the at least one substation comprising a power limiter; providing electrical power from the at least one substation to a plurality of locations, each location comprising a smart power demand manager which controls electrical power delivery to at least power-drawing item; detecting at least one discrepancy with respect to the electrical network, the at least one discrepancy comprising at least one of: an unbalanced network load; an unscheduled network load; a change in network supply; and a change in network condition; and controlling, in response to detecting the at least one discrepancy, electrical power delivery with respect to at least one of the locations, the controlling comprising employing the power limiter of the at least one substation in collaboration with at least one smart power demand manager to control electrical power delivery.

Another aspect of the invention provides an apparatus comprising: at least one processor; and a computer readable storage medium having computer readable program code embodied therewith and executable by the at least one processor, the computer readable program code comprising: computer readable program code configured to manage delivery of electrical power from an electrical network to at least one substation, the electrical network including an electrical generation grid in communication with the at least one substation, the at least one substation comprising a power limiter; computer readable program code configured to manage delivery of electrical power from the at least one substation to a plurality of locations, each location comprising a smart power demand manager which controls electrical power delivery to at least power-drawing item; computer readable program code configured to detect at least one discrepancy with respect to the electrical network, the at least one discrepancy comprising at least one of: an unbalanced network load; an unscheduled network load; a change in network supply; and a change in network condition; computer readable program code configured to control, in response to detecting the at least one discrepancy, electrical power delivery with respect to at least one of the locations; and computer readable program code configured to employ the power limiter of the at least one substation in collaboration with at least one smart power demand manager to control electrical power delivery.

An additional aspect of the invention provides a computer program product comprising: a computer readable storage medium having computer readable program code embodied therewith, the computer readable program code comprising: computer readable program code configured to manage delivery of electrical power from an electrical network to at least one substation, the electrical network including an electrical generation grid in communication with the at least one substation, the at least one substation comprising a power limiter; computer readable program code configured to manage delivery of electrical power from the at least one substation to a plurality of locations, each location comprising a smart power demand manager which controls electrical power delivery to at least power-drawing item; computer readable program code configured to detect at least one discrepancy with respect to the electrical network, the at least one discrepancy comprising at least one of: an unbalanced network load; an unscheduled network load; a change in network supply; and a change in network condition; computer readable program code configured to control, in response to detecting the at least one discrepancy, electrical power delivery with respect to at least one of the locations; and computer readable program code configured to employ the power limiter of the at least one substation in collaboration with at least one smart power demand manager to control electrical power delivery.

A further aspect of the invention provides a method comprising: providing electrical power from an electrical network to at least one substation, the electrical network including an electrical generation grid in communication with the at least one substation, the at least one substation comprising a power limiter; providing electrical power from the electrical network to a plurality of locations, the electrical network including an electrical generation grid in communication with the plurality of locations, each location comprising a smart power demand manager, each location comprising at least one member selected from the group consisting of: a residential unit and a commercial unit; detecting at least one discrepancy with respect to the electrical network, the at least one discrepancy comprising at least one of: an unbalanced network load; an unscheduled network load; a change in network supply; and a change in network condition; and controlling at least one of the at least one power limiter, in response to detecting the at least one discrepancy, to limit a supply of electrical power to at least one of the locations, the at least one power limiter being in communication with the smart power demand manager of at least one location, the at least one power limiter comprising at least one member selected from the group consisting of: a substation power limiter; a residential unit power limiter; and a commercial unit power limiter.

For a better understanding of exemplary embodiments of the invention, together with other and further features and advantages thereof, reference is made to the following description, taken in conjunction with the accompanying drawings, and the scope of the claimed embodiments of the invention will be pointed out in the appended claims.

BRIEF DESCRIPTION OF THE SEVERAL VIEWS OF THE DRAWINGS

FIG. 2 sets forth a first maximization function.

FIG. 4 sets forth a second maximization function.

DETAILED DESCRIPTION

Figure 1:
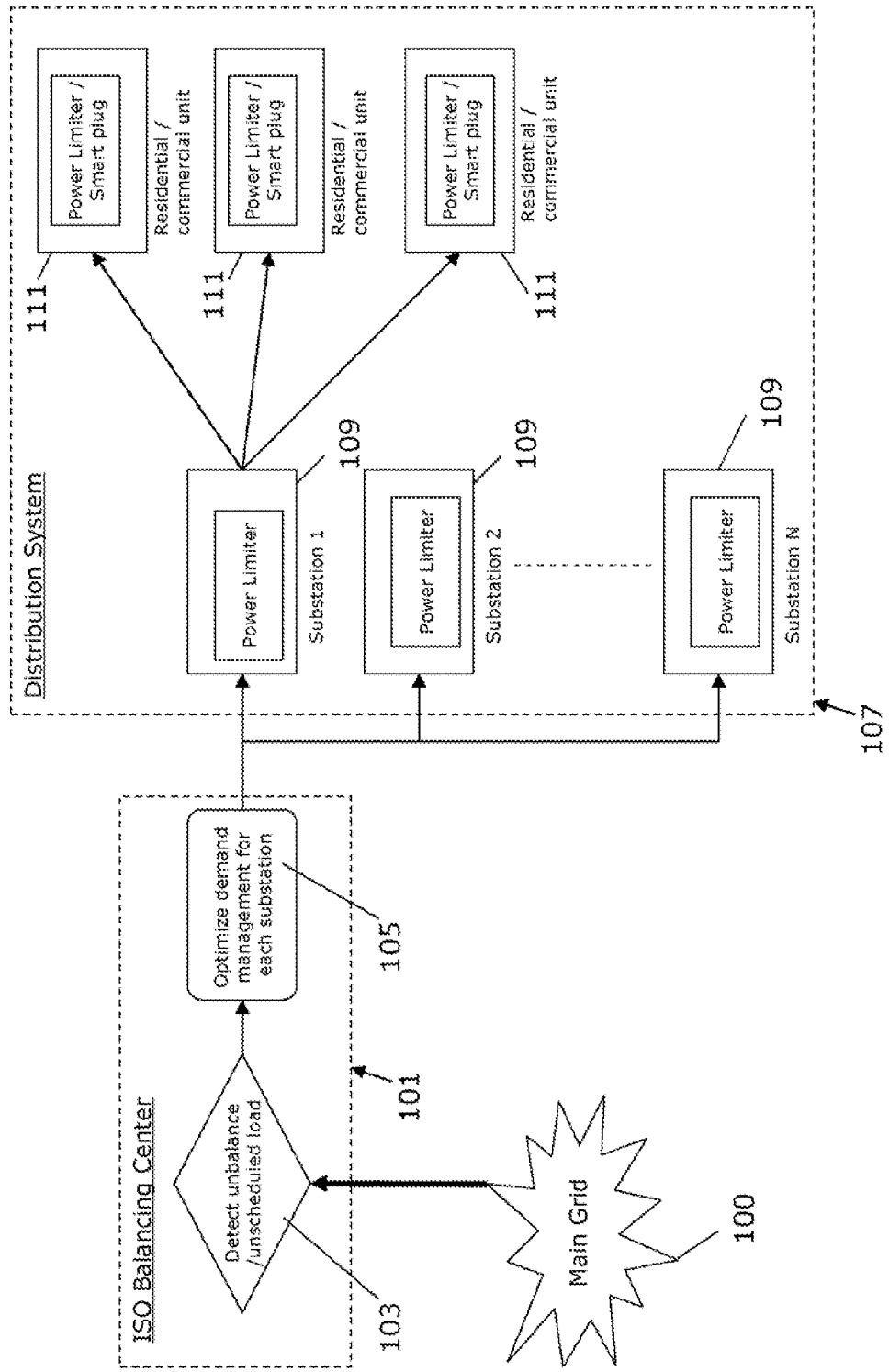
FIG. 1 schematically illustrates a system architecture.

It will be readily understood that the components of the embodiments of the invention, as generally described and illustrated in the figures herein, may be arranged and designed in a wide variety of different configurations in addition to the described exemplary embodiments. Thus, the following more detailed description of the embodiments of the invention, as represented in the figures, is not intended to limit the scope of the embodiments of the invention, as claimed, but is merely representative of exemplary embodiments of the invention.

Reference throughout this specification to "one embodiment" or "an embodiment" (or the like) means that a particular feature, structure, or characteristic described in connection with the embodiment is included in at least one embodiment of the invention. Thus, appearances of the phrases "in one embodiment" or "in an embodiment" or the like in various places throughout this specification are not necessarily all referring to the same embodiment.

Furthermore, the described features, structures, or characteristics may be combined in any suitable manner in at least one embodiment. In the following description, numerous specific details are provided to give a thorough understanding of embodiments of the invention. One skilled in the relevant art may well recognize, however, that embodiments of the invention can be practiced without at least one of the specific details thereof, or can be practiced with other methods, components, materials, et cetera. In other instances, well-known structures, materials, or operations are not shown or described in detail to avoid obscuring aspects of the invention.

The description now turns to the figures. The illustrated embodiments of the invention will be best understood by reference to the figures. The following description is intended only by way of example and simply illustrates certain selected exemplary embodiments of the invention as claimed herein.

It should be noted that the flowchart and block diagrams in the figures illustrate the architecture, functionality, and operation of possible implementations of systems, apparatuses, methods and computer program products according to various embodiments of the invention. In this regard, each block in the flowchart or block diagrams may represent a module, segment, or portion of code, which comprises at least one executable instruction for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Specific reference will now be made herebelow to FIGS. 1-5. It should be appreciated that the processes, arrangements and products broadly illustrated therein can be carried out on, or in accordance with, essentially any suitable computer system or set of computer systems, which may, by way of an illustrative and non-restrictive example, include a system or server such as that indicated at 12' in FIG. 7. In accordance with an example embodiment, most if not all of the process steps, components and outputs discussed with respect to FIGS. 1-5 can be performed or utilized by way of a processing unit or units and system memory such as those indicated, respectively, at 16' and 28' in FIG. 7, whether on a server computer, a client computer, a node computer in a distributed network, or any combination thereof.

Broadly contemplated herein, in accordance with at least one embodiment of the invention, is a system and a method for Demand Side Management (DSM) that allows utilities to enforce a reduction in demand with minimal or reduced user involvement. Thus, at least a portion of the reduction can be guaranteed which is very useful in maintaining the stability of the grid particularly when incorporating renewable energy or for cost reduction.

It is recognized, in accordance with at least one embodiment of the invention, that peak power, spinning reserve and spot purchase of electricity are expensive and even a small reduction in peak supply can reduce costs substantially. Thus, systems and methods as broadly contemplated herein allow users to estimate, control or reduce their total load without revealing their consumption and requirements to a utility company, thus significantly allaying privacy concerns.

Accordingly, broadly contemplated herein, in accordance with at least one embodiment of the invention, are systems and methods that:

dynamically enforce demand/load management so that some portion of the reduction is guaranteed, thereby ensuring grid stability, minimizing electricity prices, lower losses and increased utilization of intermittent renewable sources like wind;

allow consumption agents to optimally schedule and modify loads based on available limits, on budget and on utility (i.e., a measure of the benefits that consumers gain from the consumption of electricity both explicitly and implicitly) and preserve consumer privacy as well as security and stability of the grid.

Figure 1A:
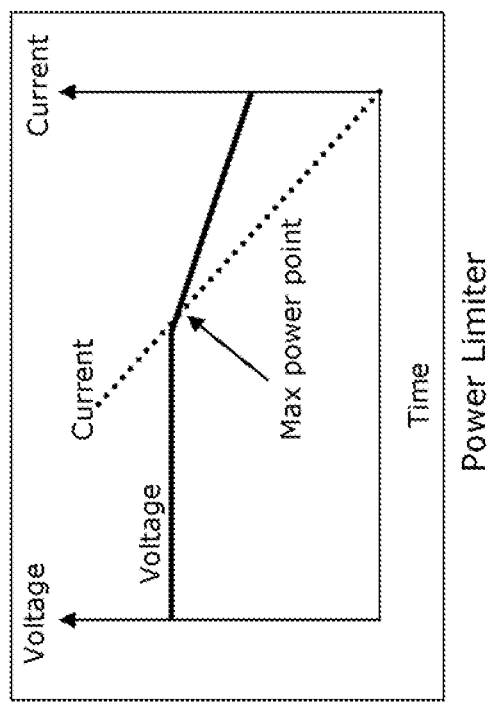
FIG. 1a graphically illustrates an effect of a power limiter.
Figure 3:
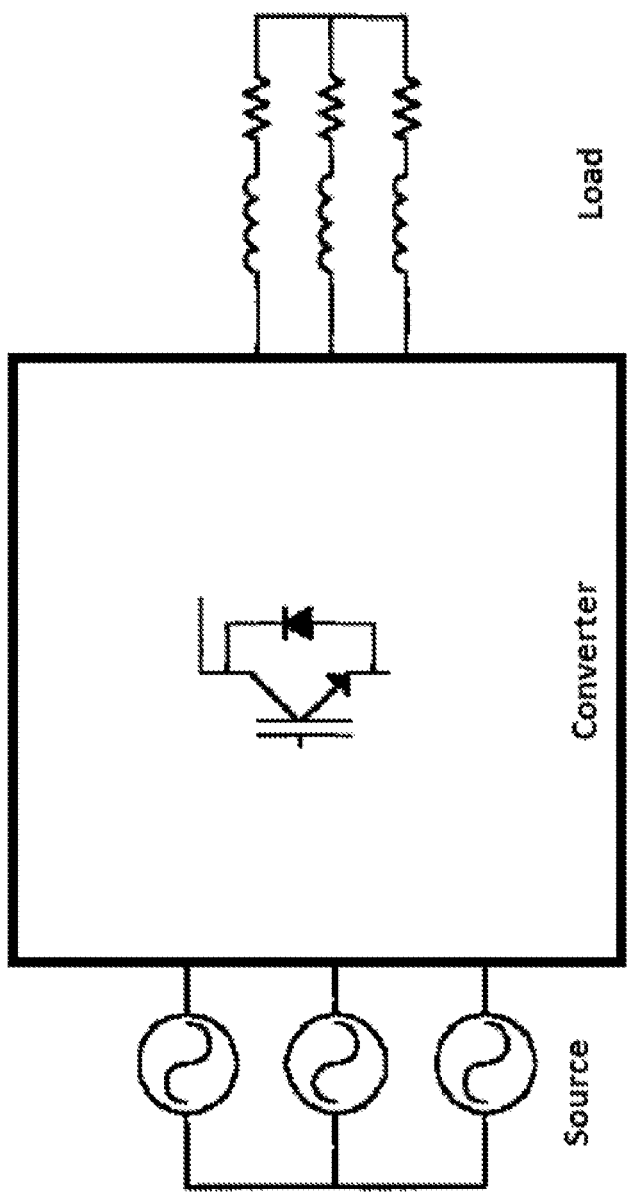
FIG. 3 illustrates sample power limiter circuitry.

FIG. 1 schematically illustrates a system architecture, in accordance with at least one embodiment of the invention, while FIG. 1a graphically illustrates an effect of a power limiter. As shown in FIG. 1, unbalance detection (103) and power scheduling (105) can be implemented at a load balancing center (itself in communication with a main electrical generation grid 100). Unbalance (or an unscheduled supply or load) is detected using smart meter sensing voltage, frequency or other waveform or system characteristics. Unbalance may also be predicted using forecasts of these characteristics into the future using statistical or signal processing techniques. The unbalance detector then computes schedules for substations while respecting external constraints (such as priority of loads, day-ahead commitments, location-based pricing, consumption curtailing contracts which stipulate the renumeration that is to be paid to different users in return for load curtailment, costs, etc.). The balancing center (e.g., a server thereof) communicates with power limiters (e.g., through a powerline, WiFi, etc.) in a distribution subsystem 107 to dynamically limit the maximum power.

As such, in accordance with at least one embodiment of the invention, a power limiter can be installed in each of several distribution substations 109 and also at smart homes or commercial places (i.e., residential or commercial units with smart meters, smart distribution systems and/or smart plugs) 111. The power limiter dynamically limits the input power based on inputs and signals from the unbalance detector and scheduler. It operates in two modes: when the power drawn is less than maximum it maintains constant voltage; and when maximum power is reached, voltage drops while current increases. On the other hand, a smart power demand manager, which could be embodied by at least one smart meter, smart distribution system and/or at least one smart plug, can also be installed at homes/commercial places. They may each sense input electrical properties such as frequency, voltage, current and other electricity waveform characteristics, or receive communication from users or the utilities or other distributed or central authority and automatically control appliances or other items drawing electrical power. A smart meter would assume such control over a portion or entirety of a home or commercial place, while a smart plug would assume such control with respect to an individual appliance or other power-drawing item that is plugged into the smart plug. A smart distribution system would allocate portions of electrical power to two or more individual appliances or power-drawing items in response to sensed input electrical properties. They may also each be capable of acting in the manner of a power limiter (as described herein and as illustrated, e.g., with respect to FIG. 1$a$), and/or may be in communication with a component acting strictly as a power limiter while carrying out separate fine-tuning adjustments to power delivery.

Generally, in accordance with at least one embodiment of the invention, a central authority (e.g., at a substation) can tailor limits to different locations depending on the existence of smart meters and plugs. For example, if a location has smart meters then it may be possible to minimize user discomfort, and they can be warned or given better incentives during or prior to power limiting. In addition, existence of these smart meters can decrease the inconvenience to users since they can appropriately schedule or prioritize more useful appliances when power is limited.

In accordance with at least one embodiment of the invention, the unbalance detector (103) detects power quality/power signal disturbances at different time scales. The time scale for this purpose can be rendered as frequent as logistically possible and/or can be tailored depending upon communication constraints, sensor response time and cost constraints. Measurements could be periodic (e.g., where sensors are polled every few milliseconds) or aperiodic (e.g., where sensors automatic report anomalous or important measurements). Time series signals x(t) are accepted as input from any available sensors including load meters, transformer meters, synchro-phasors, SCADA (supervisory control and data acquisition) systems, thermal and other ambient measurements. In one embodiment, the unbalance detector includes an expert system with inputs as features f(t) extracted from the measured and predicted signals using techniques such as such as wavelet transforms, FFT coefficients, etc. Also accepted as input are any available predictions of the "state" signals using processing techniques such as Kalman filters, particle filters, etc. As such, an expert system can be trained using historical data to detect and predict anomalous system behavior. In one embodiment, there is provided a recursive (A(t)) model for the wavelet coefficients, which is learned from historical data. Such a model can appear as: f(t+1)=A(t)*f(t)+c(t), where changes in A would correspond to transients in the signal.

In accordance with at least one embodiment of the invention, the scheduler (105) takes as input the current and predicted system state from the unbalance detector (103). It also takes as input a set of desired trajectories T that the system state should follow. It further takes in the utilities of the users or loads for different power availabilities $z_i$, denoted by $U(z_i)$; this can be estimated from historical data or requested from the loads. For these desired trajectories, it also takes as input or calculates desired complex voltage/current/power $p_i^t$ at each controlled location or load i that would allow the system to follow the desired trajectory; a sample calculation is shown in FIG. 2. The p's form the complex power budgets for each control location/load. A similar method can be extended to account for uncertainty in the predicted values using stochastic or robust optimization techniques.

In accordance with at least one embodiment of the invention, a power limiter can be an AC/AC converter which converts an AC waveform such as the main supply to another AC waveform, where the output voltage/current/power can be controlled by switching thiristors. Converter control techniques including (but not limited to) pulse width modulation (PWM) can be used to control the output quantity (voltage/current/power). The power limiter limits the power drawn from the source by controlling the converter (as shown via the sample circuitry shown in FIG. 3). When the load tries to draw more current beyond the limit, it reduces the source voltage to maintain the constant power.

In accordance with at least one embodiment of the invention, with regard to smart meters/plugs, a home level smart meter can receive a signal from the grid specifying load budgets for a particular slot or sequence of slots. It can also receive as signal or estimate an expected budget over the next T time slots. In one embodiment, the smart meter solves the budgeted optimization problem shown in FIG. 4. This can be solved using commercial mathematical program solvers; one example of a suitable solver is CPLEX, developed by International Business Machines Corporation of Armonk, N.Y.

Figure 5:
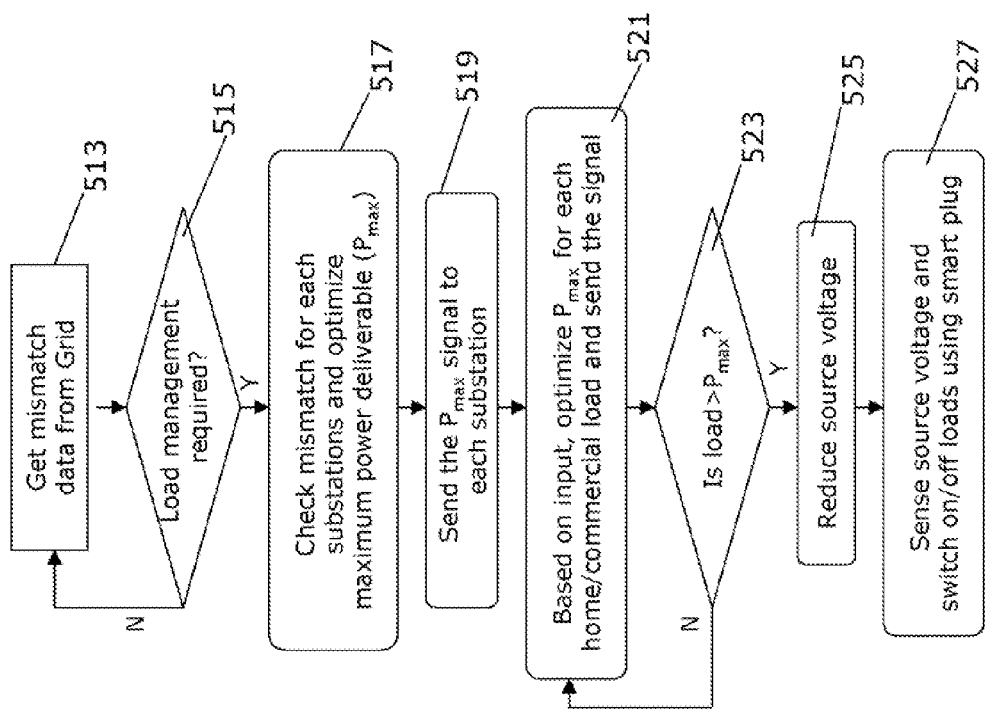
FIG. 5 schematically illustrates an operational process.

FIG. 5 schematically illustrates an operational process, in accordance with at least one embodiment of the invention. A shown, mismatch data are obtained (513) from the general grid (as can be performed, e.g., by the unbalance detector in the load balancing scheduler in FIG. 1). If (515) load management is determined to be required, a check is made for mismatch with respect to each substation, and a maximum power deliverable is optimized (e.g., via the optimizer of the load balancing scheduler in FIG. 1) (517). The maximum power signal is sent to each substation (519) and, based on inputs, maximum power is optimized for each home or commercial load (and a signal corresponding to this optimized power is sent to each home or commercial establishment in question) (521). If (523) a measured load at a home or commercial establishment is greater than the maximum power, then source voltage is reduced by way of restricting the usage and power consumption of appliances (525). Source voltage, frequency or another electricity waveform property can then be sensed locally at the home, building, office, or other commercial, agricultural or residential location or a signal can be sent to the smart plugs, loads or meters (527); loads are controlled, e.g., via a smart plug, smart appliance, or via communicating to the user that device usage needs to be modified. (It can thus be noted that even without any device control, a central authority is guaranteed a decrease in power consumption, though appliances may not function properly if their usage is not controlled.)

Figure 6:
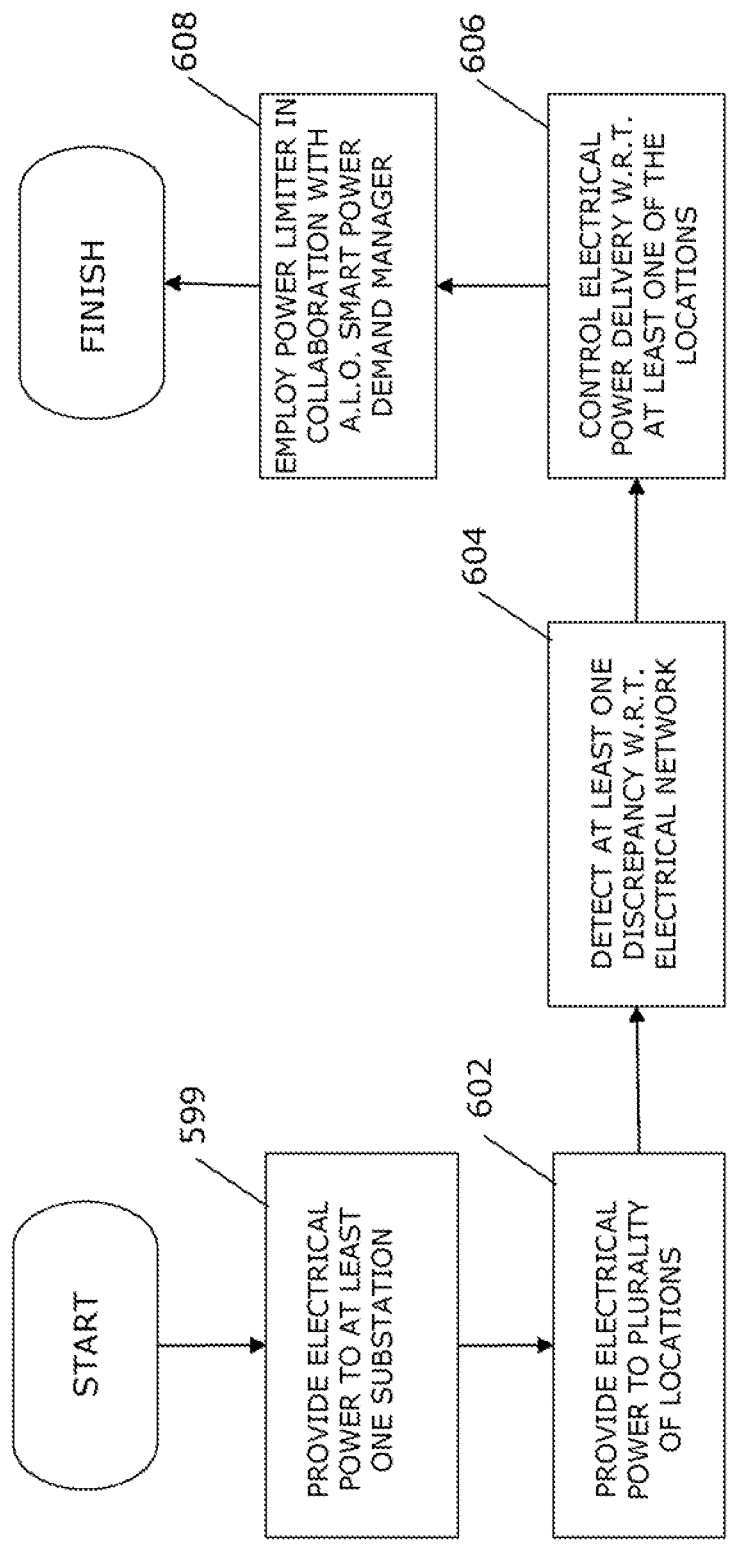
FIG. 6 sets forth a process more generally for enforcing demand management in electrical grids.

FIG. 6 sets forth a process more generally for enforcing demand management in electrical grids, in accordance with at least one embodiment of the invention. It should be appreciated that a process such as that broadly illustrated in FIG. 6 can be carried out on essentially any suitable computer system or set of computer systems, which may, by way of an illustrative and non-restrictive example, include a system such as that indicated at 12' in FIG. 7. In accordance with an example embodiment, most if not all of the process steps discussed with respect to FIG. 6 can be performed by way of a processing unit or units and system memory such as those indicated, respectively, at 16' and 28' in FIG. 7.

As shown in FIG. 6, in accordance with at least one embodiment of the invention, electrical power is provided from an electrical network to at least one substation, the electrical network including an electrical generation grid in communication with the at least one substation, the at least one substation comprising a power limiter (599). Electrical power is provided from the at least one substation to a plurality of locations, each location comprising a smart power demand manager which controls electrical power delivery to at least power-drawing item (602). At least one discrepancy is detected with respect to the electrical network, the at least one discrepancy comprising at least one of: an unbalanced network load; an unscheduled network load; a change in network supply; and a change in network condition (604). In response to detecting the at least one discrepancy, electrical power delivery with respect to at least one of the locations is controlled (606), which involves employing the power limiter of the at least one substation in collaboration with at least one smart power demand manager to control electrical power delivery (608).

Figure 7:
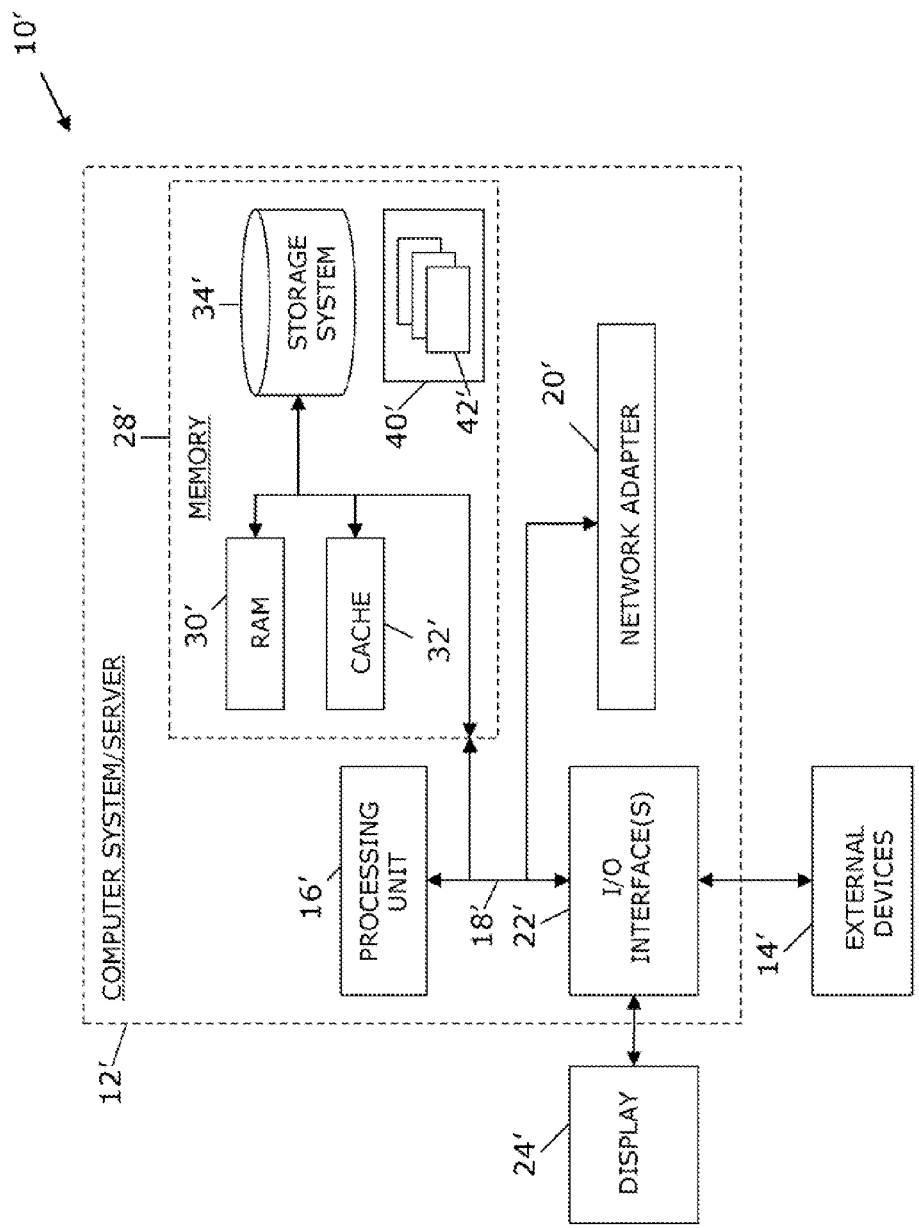
FIG. 7 illustrates a computer system.

Referring now to FIG. 7, a schematic of an example of a cloud computing node is shown. Cloud computing node 10' is only one example of a suitable cloud computing node and is not intended to suggest any limitation as to the scope of use or functionality of embodiments of the invention described herein. Regardless, cloud computing node 10' is capable of being implemented and/or performing any of the functionality set forth hereinabove. In accordance with embodiments of the invention, computing node 10' may not necessarily even be part of a cloud network but instead could be part of another type of distributed or other network, or could represent a stand-alone node. For the purposes of discussion and illustration, however, node 10' is variously referred to herein as a "cloud computing node".

In cloud computing node 10' there is a computer system/server 12', which is operational with numerous other general purpose or special purpose computing system environments or configurations. Examples of well-known computing systems, environments, and/or configurations that may be suitable for use with computer system/server 12' include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12' may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12' may be practiced in distributed cloud computing environments where tasks are performed by remote processing devices that are linked through a communications network. In a distributed cloud computing environment, program modules may be located in both local and remote computer system storage media including memory storage devices.

As shown in FIG. 7, computer system/server 12' in cloud computing node 10 is shown in the form of a general-purpose computing device. The components of computer system/server 12' may include, but are not limited to, at least one processor or processing unit 16', a system memory 28', and a bus 18' that couples various system components including system memory 28' to processor 16'.

Bus 18' represents at least one of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12' typically includes a variety of computer system readable media. Such media may be any available media that are accessible by computer system/server 12', and includes both volatile and non-volatile media, removable and non-removable media.

System memory 28' can include computer system readable media in the form of volatile memory, such as random access memory (RAM) 30' and/or cache memory 32'. Computer system/server 12' may further include other removable/non-removable, volatile/non-volatile computer system storage media. By way of example only, storage system 34' can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18' by at least one data media interface. As will be further depicted and described below, memory 28' may include at least one program product having a set (e.g., at least one) of program modules that are configured to carry out the functions of embodiments of the invention.

Program/utility 40', having a set (at least one) of program modules 42', may be stored in memory 28' (by way of example, and not limitation), as well as an operating system, at least one application program, other program modules, and program data. Each of the operating systems, at least one application program, other program modules, and program data or some combination thereof, may include an implementation of a networking environment. Program modules 42' generally carry out the functions and/or methodologies of embodiments of the invention as described herein.

Computer system/server 12' may also communicate with at least one external device 14' such as a keyboard, a pointing device, a display 24', etc.; at least one device that enables a user to interact with computer system/server 12'; and/or any devices (e.g., network card, modem, etc.) that enable computer system/server 12' to communicate with at least one other computing device. Such communication can occur via I/O interfaces 22'. Still yet, computer system/server 12' can communicate with at least one network such as a local area network (LAN), a general wide area network (WAN), and/or a public network (e.g., the Internet) via network adapter 20'. As depicted, network adapter 20' communicates with the other components of computer system/server 12' via bus 18'. It should be understood that although not shown, other hardware and/or software components could be used in conjunction with computer system/server 12'. Examples include, but are not limited to: microcode, device drivers, redundant processing units, external disk drive arrays, RAID systems, tape drives, and data archival storage systems, etc.

It should be noted that aspects of the invention may be embodied as a system, method or computer program product. Accordingly, aspects of the invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the invention may take the form of a computer program product embodied in at least one computer readable medium having computer readable program code embodied thereon.

Any combination of one or more computer readable media may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having at least one wire, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store, a program for use by, or in connection with, an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wire line, optical fiber cable, RF, etc., or any suitable combination of the foregoing.

Computer program code for carrying out operations for aspects of the invention may be written in any combination of at least one programming language, including an object oriented programming language such as Java®, Smalltalk, C++ or the like and conventional procedural programming languages, such as the "C" programming language or similar programming languages. The program code may execute entirely on the user's computer (device), partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the invention are described herein with reference to flowchart illustrations and/or block diagrams of methods, apparatus (systems) and computer program products. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture. Such an article of manufacture can include instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

This disclosure has been presented for purposes of illustration and description but is not intended to be exhaustive or limiting. Many modifications and variations will be apparent to those of ordinary skill in the art. The embodiments were chosen and described in order to explain principles and practical application, and to enable others of ordinary skill in the art to understand the disclosure.

Although illustrative embodiments of the invention have been described herein with reference to the accompanying drawings, it is to be understood that the embodiments of the invention are not limited to those precise embodiments, and that various other changes and modifications may be affected therein by one skilled in the art without departing from the scope or spirit of the disclosure.

What is claimed is:

1. A method comprising:

managing delivery of electrical power from an electrical network to at least one substation, the electrical network including an electrical generation grid in communication with the at least one substation, the at least one substation comprising a power limiter, wherein the at least one substation distributes electrical power to a plurality of locations, each location comprising a smart power demand manager which controls electrical power delivery to at least one power-drawing item;

detecting at least one discrepancy with respect to the electrical network, the at least one discrepancy comprising at least one of: an unbalanced network load; an unscheduled network load; a change in network supply; and a change in network condition;

predicting a subsequent unbalanced system state; and based on said detecting and predicting, controlling electrical power delivery with respect to at least one of the locations, via establishing generation levels and power levels relative to the at least one substation and the plurality of locations;

said controlling comprising communicating with the power limiter of the at least one substation and at least one smart power demand manager, upon said establishing of generation levels and power levels, to control electrical power delivery.

2. The method according to claim 1, wherein said communicating with at least one smart power demand manager comprises communicating with at least one member selected from the group consisting of: a smart meter, a smart distribution system, and a smart plug.

3. The method according to claim 1, wherein the smart power demand manager controls electrical power delivery to at least a portion of a building.

4. The method according to claim 1, wherein said detecting comprises accepting input from at least one member selected from the group consisting of: a phasor measurement unit; a load meter; a transformer meter; a synchro-phasor; a SCADA measurement system; thermal measurement; ambient condition measurement; a smart meter; a smart plug; a grid level sensor; a distribution level sensor; a prediction of future renewable energy availability; generator availability; and a load level associated with a residential or commercial consumer.

5. The method according to claim 4, wherein said controlling comprises employing a balancing center that employs the accepted input.

6. The method according to claim 5, wherein said employing of a balancing center comprises, for determining generation levels and power levels in a generation and distribution grid, employing at least one member selected from the group consisting of: a financial contract; a power delivery guarantee; a generator preference; and a consumer preference.

7. The method according to claim 1, wherein said communicating with at least one smart power demand manager comprises communicating with a scheduler that determines a scheduling of power delivery to at least one power-drawing item.

8. The method according to claim 1, wherein said communicating with a scheduler comprises communicating with a scheduler that receives, as input, at least one member selected from the group consisting of: detected voltage; detected frequency; and a communication signal.

9. An apparatus comprising:
at least one processor; and
a computer readable storage medium having computer readable program code embodied therewith and executable by the at least one processor, the computer readable program code comprising:
computer readable program code configured to manage delivery of electrical power from an electrical network to at least one substation, the electrical network including an electrical generation grid in communication with the at least one substation, the at least one substation comprising a power limiter, wherein the at least one substation distributes electrical power to a plurality of locations, each location comprising a smart power demand manager which controls electrical power delivery to at least one power-drawing item;
computer readable program code configured to detect at least one discrepancy with respect to the electrical network, the at least one discrepancy comprising at least one of: an unbalanced network load; an unscheduled network load; a change in network supply; and a change in network condition;
computer readable program code configured to predict a subsequent unbalanced system state;
computer readable program code configured, based on the detecting and predicting, to control electrical power delivery with respect to at least one of the locations, via establishing generation levels and power levels relative to the at least one substation and the plurality of locations; and
computer readable program code configured to communicate with the power limiter of the at least one substation and at least one smart power demand manager to control electrical power delivery.

10. A computer program product comprising:
a computer readable storage medium having computer readable program code embodied therewith, the computer readable program code comprising:
computer readable program code configured to manage delivery of electrical power from an electrical network to at least one substation, the electrical network including an electrical generation grid in communication with the at least one substation, the at least one substation comprising a power limiter, wherein the at least one substation distributes electrical power to a plurality of locations, each location comprising a smart power demand manager which controls electrical power delivery to at least one power-drawing item;
computer readable program code configured to detect at least one discrepancy with respect to the electrical network, the at least one discrepancy comprising at least one of: an unbalanced network load; an unscheduled network load; a change in network supply; and a change in network condition;
computer readable program code configured to predict a subsequent unbalanced system state;
computer readable program code configured, based on the detecting and predicting, to control electrical power delivery with respect to at least one of the locations, via establishing generation levels and power levels relative to the at least one substation and the plurality of locations; and
computer readable program code configured to communicate with the power limiter of the at least one substation and at least one smart power demand manager to control electrical power delivery.

11. The computer program product according to claim 10, wherein the communicating with at least one smart power demand manager comprises communicating with at least one member selected from the group consisting of: a smart meter, a smart distribution system, and a smart plug.

12. The computer program product according to claim 10, wherein the smart power demand manager controls electrical power delivery to at least a portion of a building.

13. The computer program product according to claim 10, wherein the detecting comprises accepting input from at least one member selected from the group consisting of: a phasor measurement unit; a load meter; a transformer meter; a synchro-phasor; a SCADA measurement system; thermal measurement; ambient condition measurement; a smart meter; a smart plug; a grid level sensor; a distribution level sensor; a prediction of future renewable energy availability; generator availability; and a load level associated with a residential or commercial consumer.

14. The computer program product according to claim 10, wherein the communicating with at least one smart power demand manager comprises communicating with a scheduler that determines a scheduling of power delivery to at least one power-drawing item.

15. The computer program product according to claim 14, wherein the communicating with a scheduler comprises communicating with a scheduler that receives, as input, at least one member selected from the group consisting of: detected voltage; detected frequency; and a communication signal.

16. A method comprising:
utilizing at least one processor to execute computer code configured to perform the steps of:
managing delivery of electrical power from an electrical network to at least one substation, the electrical network including an electrical generation grid in communication with the at least one substation, the at least one substation comprising a power limiter, wherein the at least one substation distributes electrical power from the electrical network to a plurality of locations, the electrical network including an electrical generation grid in communication with the plurality of locations, each location comprising a smart power demand manager, each location comprising at least one member selected from the group consisting of: a residential unit and a commercial unit;
detecting at least one discrepancy with respect to the electrical network, the at least one discrepancy comprising at least one of: an unbalanced network load; an unscheduled network load; a change in network supply; and a change in network condition;
predicting a subsequent unbalanced system state; and
based on said detecting and predicting, controlling electrical power delivery with respect to at least one of the locations, via establishing generation levels and power levels relative to the at least one substation and the plurality of locations;
said controlling comprising, upon said establishing of generation levels and power levels, communicating with at least one of the at least one power limiter, based on said detecting and predicting, to limit a supply of electrical power to at least one of the locations, the at least one power limiter being in communication with the smart power demand manager of at least one location, the at least one power limiter comprising at least one member selected from the group consisting of: a substation power limiter; a residential unit power limiter; and a commercial unit power limiter.

17. The method according to claim 1, wherein said controlling comprises:
inputting at least one trajectory to guide a subsequent system state; and
inputting utilities of different loads relative to different power availablities.

18. The method according to claim 17, wherein the utilities comprise one or more of: utilities estimated from historical data; and utilities obtained from the loads.

19. The method according to claim 1, wherein said predicting comprises training an expert system which uses historical data to detect and predict anomalous system behavior.

20. The method according to claim 1, wherein said communicating with the at least one smart power demand manager comprises communicating with a power limiter associated with the at least one smart power demand manager.

* * * * *